Figure 1:
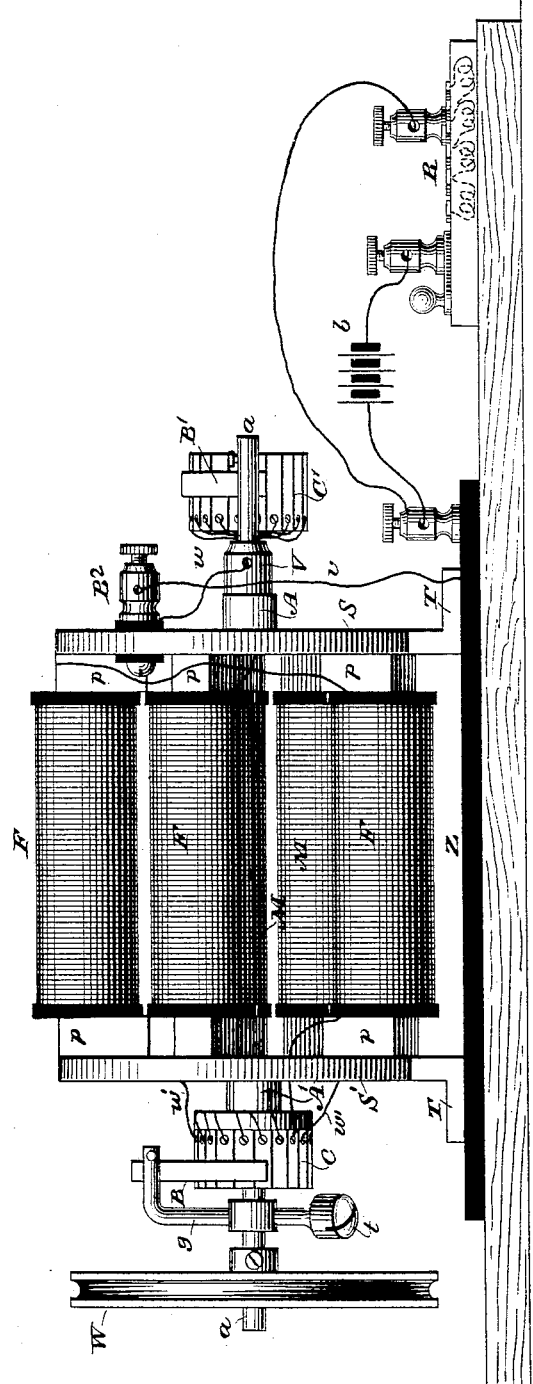

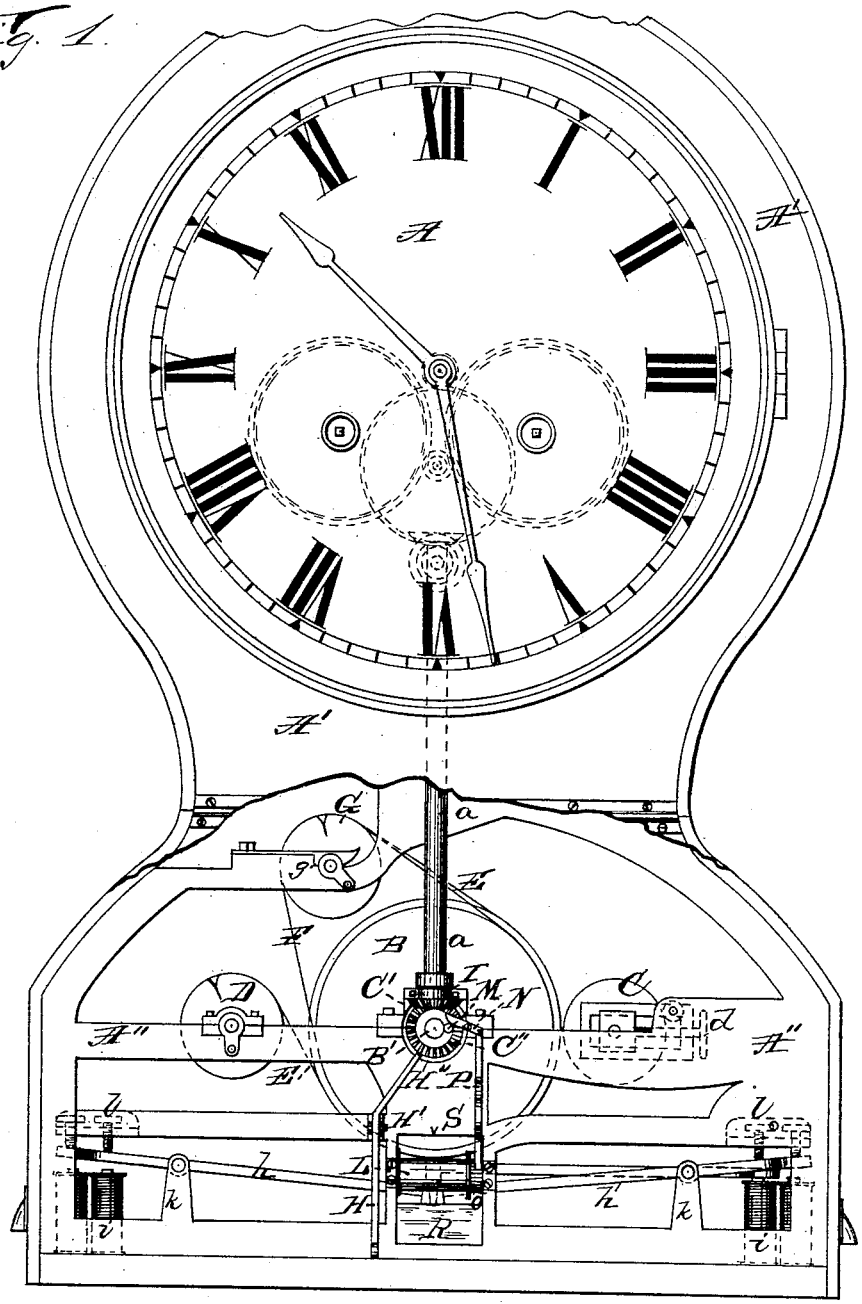

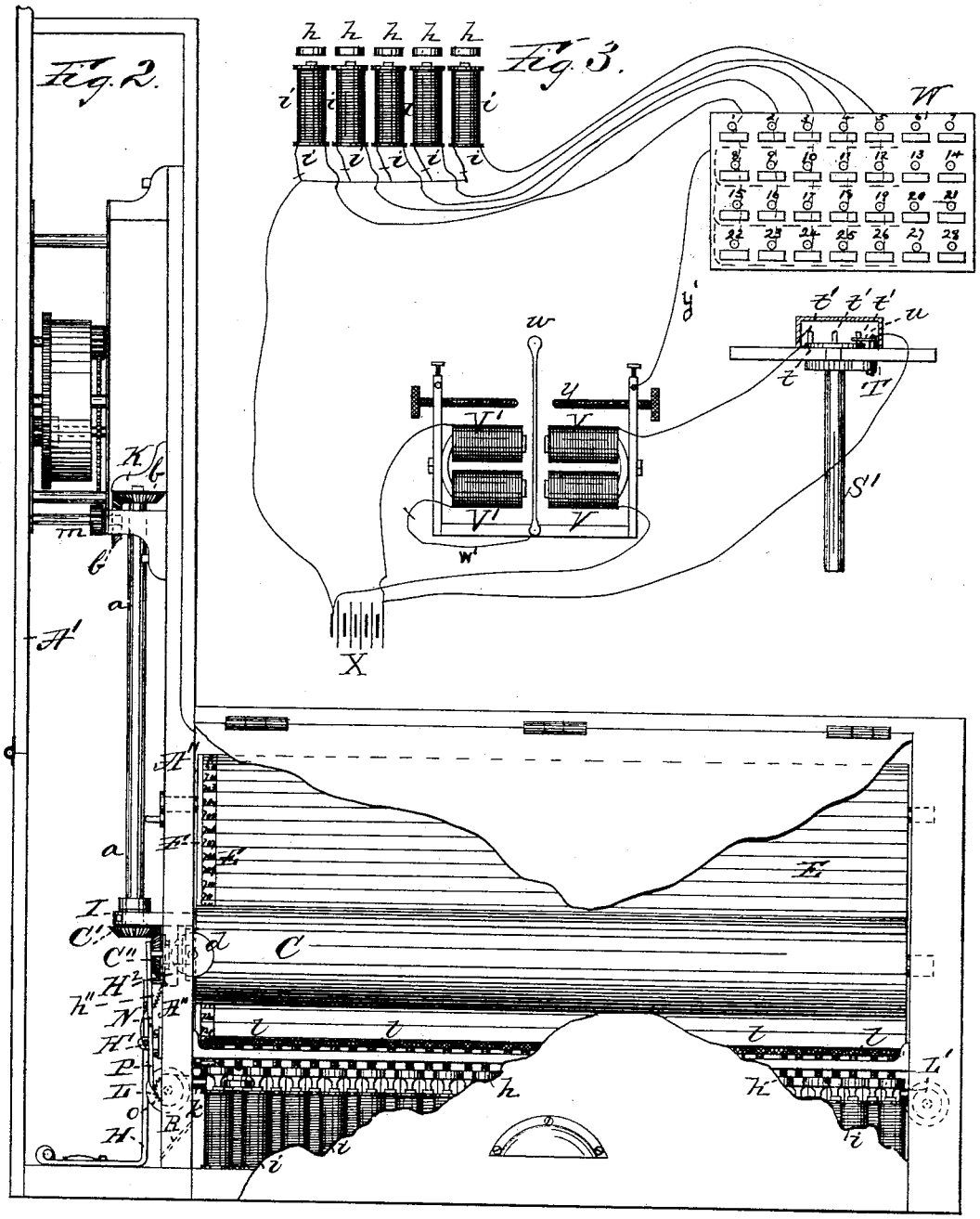

(No Model.) 5 Sheets—Sheet 3.
W. K. BASSFORD & E. B. MAYNARD.
WORKMAN'S ELECTRIC TIME RECORDER.
No. 394,049. Patented Dec. 4, 1888.
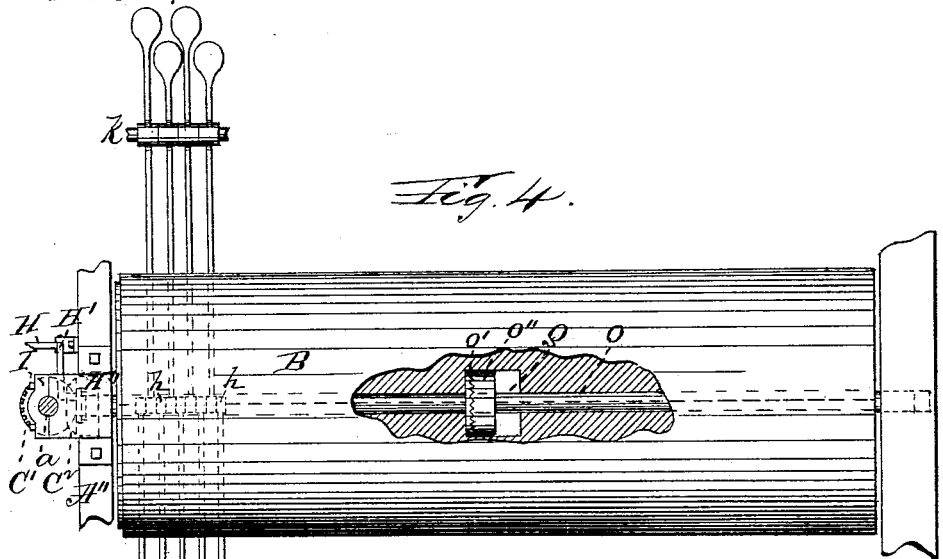
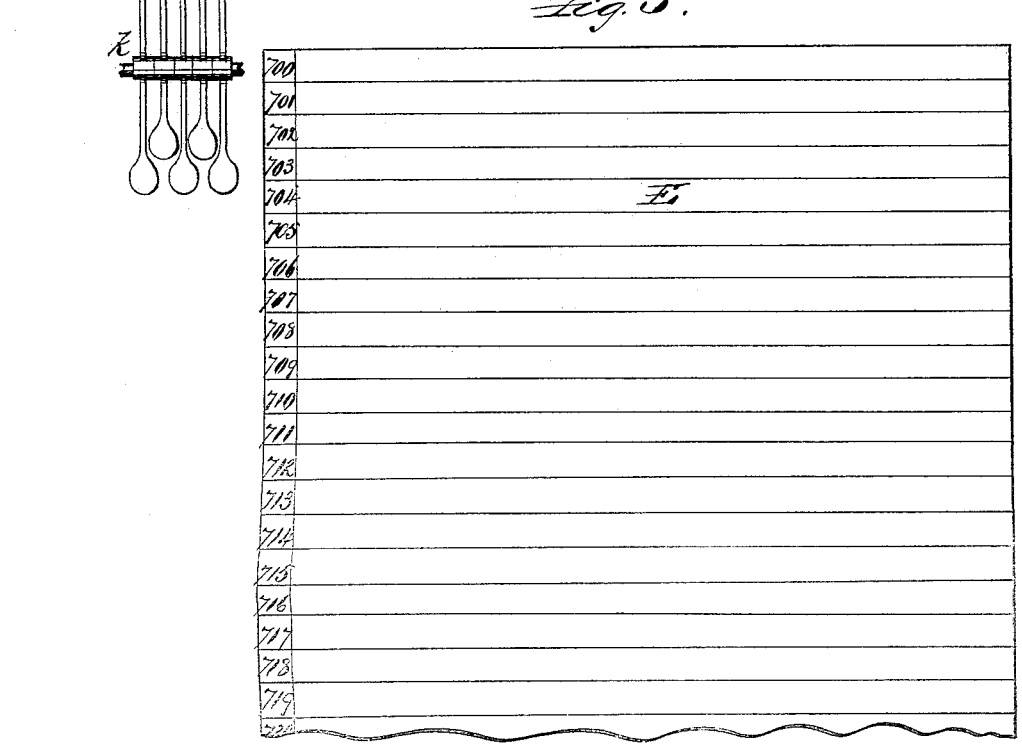
Witnesses
Jas. E. Warner
F. E. Frost
Inventors,
William K. Bassford
Edwin B. Maynard
By their Attorney
W. L. Bennem

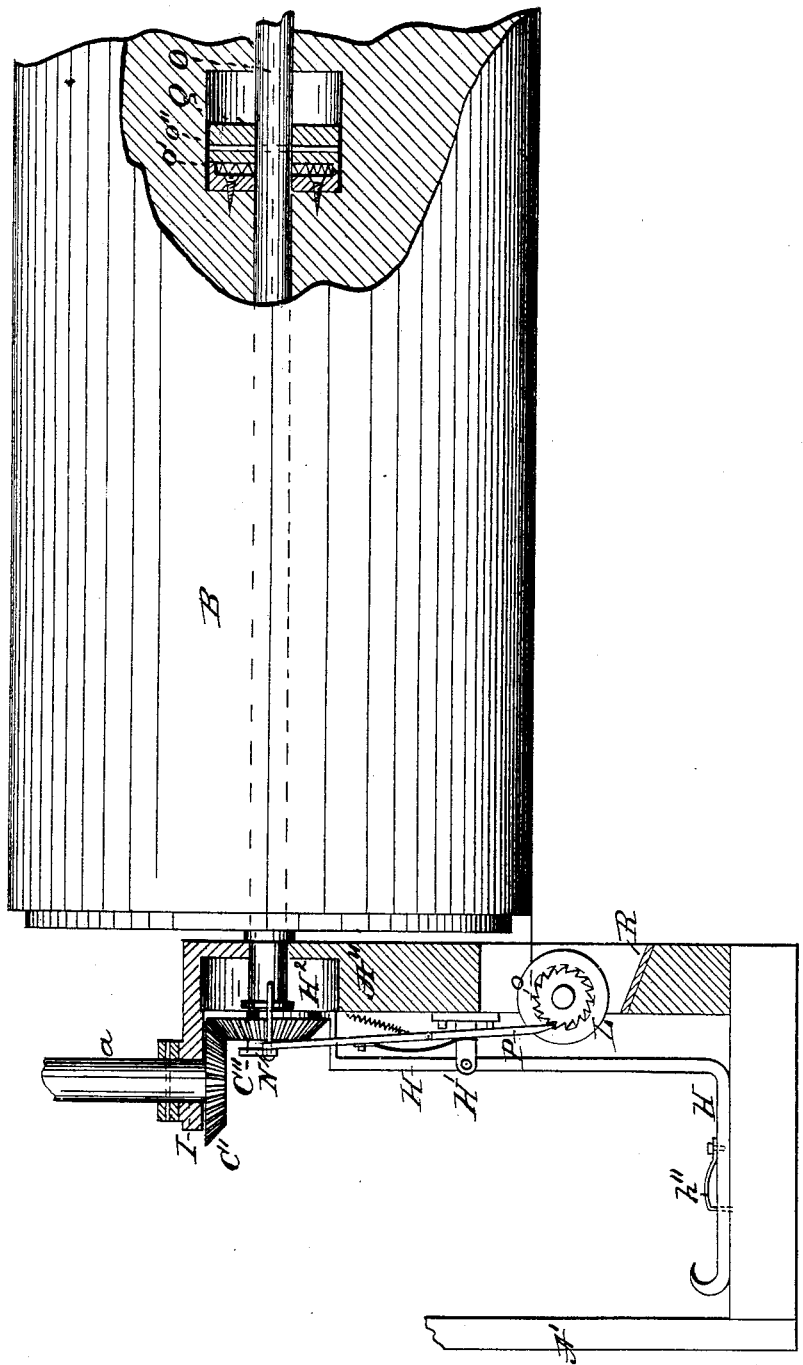

UNITED STATES PATENT OFFICE.

WILLIAM K. BASSFORD AND EDWIN B. MAYNARD, OF NEW YORK, N. Y., ASSIGNORS TO WM. K. BASSFORD, JR., & CO., OF SAME PLACE.

WORKMAN'S ELECTRIC TIME-RECORDER.

SPECIFICATION forming part of Letters Patent No. 394,049, dated December 4, 1888.

Application filed December 3, 1887. Serial No. 256,851. (No model.)

*To all whom it may concern:*

Be it known that we, WILLIAM K. BASSFORD and EDWIN B. MAYNARD, both of the city, county, and State of New York, have invented certain new and useful Improvements in Apparatus for Registering the Names of Employés and the Time of their Several Arrivals at and Departures from Factories, Offices, and other Places of Employment, of which the following is a specification, reference being had therein to the accompanying drawings.

Our invention relates to that class of time-recorders in which a roll or scroll of paper or other suitable material is moved regularly in connection with a main clock and marked by the impact of a type-bearing hammer when the workman closes an electric circuit.

The objects of our invention are, first, to provide an improved method of indicating the precise time of an employé's arrival at or departure from a designated place by means of a scroll of paper or other suitable material divided into spaces of time, actuated by clock-movement, and on which impressions are to be made by means of type-bearing hammers operated by an electrical device, as hereinafter described and set forth, and, second, for the purpose of preventing deception on the part of any employé, to provide a turnstile with an electric circuit and apparatus in connection with the same, whereby it is impossible for more than one person to register at the same time or for any person to record more than once. We attain these objects by the mechanism illustrated in the accompanying drawings, in which—

Figure 1 is a front elevational view with the casing in part removed, exhibiting the side view of the type-bearing hammers, the front view of the inked tape-roll, and the side view of the several rollers or drums and the mechanism for operating the same. Fig. 2 is a side elevational view exhibiting the main roll or drum and the recording-paper, with the method of operating the same in connection with the main clock; also the various armatures for operating the type-bearing hammers. Fig. 3 exhibits the method of arranging the electrical mechanism and the manner of operating the same. Fig. 4 is a top view of the type-bearing hammers and main roll. Fig. 5 is a section of the recording-paper, showing arrangement of time divisions, each space between the lines representing a minute. Fig. 6 is an end elevation of the main roll, showing the mechanism for its operation, the driving-wheel attached to its journal, the receiving-roll operated thereby, the roll carrying the inked tape and the method of its operation, and the mirror for the purpose of reflecting the bottom of the main roll to assist in adjusting. Fig. 7 is a side elevational view of the parts shown in Fig. 6. Fig. 8 is a side elevational view of the mechanism, showing the main roll or drum and the driving-wheel attached to its shaft, with the mechanism for operating them, the cogged pinion for engaging or disengaging the main roll or drum with the shaft, the lever for adjusting the shaft and cogged pinion attached thereto, the receiving-roll for the inked tape and the mechanism for rotating it and the mirror for the purpose of reflecting the bottom of the main roll to aid in adjusting. Fig. 9 is an elevation of the turnstile. Fig. 10 is a plan of the same.

Similar letters refer to similar parts throughout the several views.

A is the dial of the main clock, supported by a suitable case, A'.

B is the main roll, made of wood, and may be hollowed out, so as to decrease its weight, and covered with rubber for the purpose of affording a suitable material for the impact of the types. The main roll B is operated by the rod *a a*, which derives its motion from the clock by means of geared cogs at *b b* and actuates the main roll B by means of the geared cogs C' C''. The rod *a a* is journaled at I, as shown in Fig. 1, and at K, as shown in Fig. 2.

C is a small wooden roll, being equal in length to the main roll B and sanded, so as to provide a rough surface, and adjusted by the thumb-screw *d* against the scroll of recording-paper E, for the purpose of binding it to the main roll B.

D is the feed-roll upon which the scroll of recording-paper E is stored, and which is provided with a crank on its shaft, in order that the paper may be turned one way or the other for the purpose of setting or adjusting.

which is a horizontal plate, $t$, having four posts, $t'$, projecting perpendicularly therefrom. This plate is stationary and is not affected by the movements of the turnstile $S''$.

$u$ is a brass spring attached to the turnstile $S''$ so as to move in unison therewith, and connected by wire with one pole of the battery X, the plate $t$, with the projecting pins $t'$, being connected with one end of the electro-magnets V. The other end of the electro-magnets V is connected with the remaining pole of the battery X. When a person passes through the turnstile, the brass spring $u$ is moved past one of the posts $t'$ of the plate $t$, and at the moment of contact therewith completes the electric circuit and causes one end of the vibrating armature $w$ to be drawn against the point $y$ by means of the electro-magnets V. The point $y$ is connected by means of the conducting-wire $y'$ with one point of each of the push-buttons on the button-board W. The armature $w$ is connected by means of the conducting-wire $w'$ with one end of the electro-magnets $V'$, the other end of which is connected with one pole of the battery. The other pole of the battery is connected with one end of the electro-magnets $i\ i\ i\ i\ i$ in the machine, and the other end of each of the electro-magnets $i\ i\ i\ i\ i$ is connected with the correspondingly-numbered button in the button-board W. After the person has passed through the turnstile and caused the armature $w$ to be drawn against the point $y$, he is required to press the button bearing his name or the number by which he is designated. This completes the electric circuit, causing the corresponding type-bearing hammer in the machine to be drawn down by the electro-magnet $i$, so as to strike the recording-scroll E and, by means of the inked tape, to leave its imprint thereon. This circuit, passing through the electro-magnets $V'$, draws the bar $w$ away from the point $y$ and prevents any further registering until the turnstile is again revolved.

The manner of operating my mechanism is as follows: When the employé passes through the turnstile, he thereby closes the circuit from the battery through the wire connected to the post and spring circuit-closer U and pin T, thence by wire-connection to electro-magnets V, energizing said magnets and attracting the armature $w$, which then contacts with the screw Y, and it so remains by its own gravity, which partially closes the other circuit, and at the same time the turnstile being turned sufficiently to break its circuit and demagnetize magnets V. The workman then presses the particular button, which completes a circuit from the battery through electro-magnets $V'$ and wire $w'$, armature $w$, screw Y, wire $y'$, through switch-board W, thence through magnets $i$ back to battery. At the same time, by energizing magnets $V'$, the armature $w$ is attracted or drawn away from the screw Y, opening the circuit and restoring them for the next operation.

Having described our invention, we claim—

1. In a workman's time-register, a paper registering-sheet graduated into spaces indicating fixed periods of time by transverse lines and moved longitudinally by clock-work, so that the said time-spaces of the sheet are required to pass an indicating point or line in exact periods of time corresponding with the actual clock-time, in combination with magneto indicating hammers or markers arranged to make imprints on the said time card or paper by means of a carbon or inked tape-ribbon, the actuating-magnets for the hammers or markers, the electric circuit, the battery or generator, a turnstile, devices for making and breaking the circuit operated by the turnstile, and the push-buttons for closing the circuit through the hammer-actuating magnets, substantially as set forth.

2. In a workman's time-register, the combination of the graduated record-receiving sheet, clock-work devices for moving the sheet, the hammers or markers, electro-magnetic devices for operating them, the battery or generator, the electric circuit, the switch-board, the turnstile, devices operated by the turnstile for opening and closing the circuit from the generator to the switch-board, and the push-buttons for closing the circuit through the electro-magnetic devices for operating the hammers or markers, substantially as set forth.

3. A carbon or inked tape wound on retaining-rollers affixed, respectively, to its opposite ends and drawn tightly across the face of a time card or sheet and in close juxtaposition thereto, and provided with actuating mechanism driven by clock-work, so as to move the said ribbon slowly across the face of the time-sheet in fixed periods of time, in combination with said time-sheet and electro-magnetic marking-hammers arranged to strike against the said carbon ribbon and make impressions therefrom on the face of the time-sheet, said electro-magnetic marking device actuated or set in operation by a turnstile and circuit-closing keys, substantially as described and set forth.

4. An electro-magnetic time-marker provided with a regularly-moving time-sheet, electro-magnetic marking-hammers, and a turnstile arranged so that but one person at a time can press the marking-point and operate the machine, as described and set forth.

5. The mechanism for coupling or uncoupling the shaft O with the main roller or drum B, consisting of the cogged pinions $O'$ and $O''$, the actuating-lever H, attached to the shaft or axle O, and the longitudinally-sliding shaft or axle O, combined and arranged as described.

WILLIAM K. BASSFORD.
EDWIN B. MAYNARD.

Witnesses:
W. L. BENNEM,
F. C. FROST.

(No Model.) 6 Sheets—Sheet 1.

O. LUGO.
ELECTRIC MOTOR AND DYNAMO ELECTRIC MACHINE.

No. 394,075. Patented Dec. 4, 1888.

Witnesses.
Geo. W. Breck.
Carrie E. Ashley.

Inventor.
Orazio Lugo